United States Patent
Canale

[11] 3,906,907
[45] Sept. 23, 1975

[54] INTERNAL COMBUSTION ROTARY ENGINE WITH INTERNAL EXHAUST GAS RECIRCULATION

[75] Inventor: Raymond P. Canale, Warren, Mich.

[73] Assignee: General Motors Corporation, Detroit, Mich.

[22] Filed: Sept. 3, 1974

[21] Appl. No.: 502,401

[52] U.S. Cl............................. 123/8.13; 123/8.45
[51] Int. Cl.² ........................................ F02B 53/04
[58] Field of Search................ 123/8.01, 8.13, 8.45; 418/180

[56] References Cited
UNITED STATES PATENTS 3,359,954  12/1967  Eiermann et al. ............. 123/8.45 X
3,783,839  1/1974  Shimizu .............................. 123/8.45
3,795,228  3/1974  Shimizu ........................ 123/8.45 X

FOREIGN PATENTS OR APPLICATIONS 912,603  12/1962  United Kingdom................ 123/8.45

Primary Examiner—C. J. Husar
Assistant Examiner—Leonard Smith
Attorney, Agent, or Firm—Ronald L. Phillips

[57] ABSTRACT

A peripherally extending slot is provided in the internal peripheral wall of an internal combustion rotary engine at a location that provides an exhaust gas connection past the apex seal between leading and trailing chambers at the ending of the trailing chamber's exhaust phase and the ending and beginning of the leading chamber's respective intake and compression phases.

2 Claims, 4 Drawing Figures

INTERNAL COMBUSTION ROTARY ENGINE WITH INTERNAL EXHAUST GAS RECIRCULATION

This invention relates to an internal combustion rotary engine and more particularly to an internal combustion rotary engine having phased internal exhaust gas recirculation.

In internal combustion rotary engines, some of the exhaust gas can be recirculated to reduce certain engine emissions such as oxides of nitrogen. However, the arrangements that have thus far been proposed for accomplishing exhaust gas recirculation have generally required substantial engine modifications and/or additional hardware. This is particularly the case where the recirculation is phased to improve the benefits therefrom.

According to the present invention, there is provided in an internal combustion rotary engine having side intake porting and peripheral exhaust porting, a peripherally extending slot in the internal peripheral wall. This slot is located relative to the intake and exhaust porting to provide an exhaust gas connection past the apex seal on the rotor between leading and trailing chambers that is phased at the ending of the trailing chambers' exhaust phase and the ending and beginning of the leading chamber's respective intake and compression phases. As a result, the fresh mixture in the trailing portion of the leading chamber is replaced with exhaust gas for the purpose of reducing quenched hydrocarbons in this chamber when it undergoes combustion. Furthermore, the fresh mixture forced toward the leading portion of this chamber thus travels in the most rapid direction of the combustion flame to thereby help improve fuel economy. In addition, the recirculated exhaust gas located in the trailing portion of the working chambers provides a barrier to the combustion temperatures and therefore promotes apex seal life.

An object of the present invention is to provide a new and improved internal combustion rotary engine having internal exhaust gas recirculation.

Another object is to provide in an internal combustion rotary engine a periodic connection in the peripheral wall past the apex seals that effects phased internal exhaust recirculation wherein exhaust gas is directed from the leading portion of a trailing chamber at the ending of this chambers' exhaust phase into the trailing portion of the leading chamber at the ending and beginning of the latter chamber's respective intake and compression phases.

These and other objects of the present invention will be more apparent from the following description and drawing in which.

Figure 1:
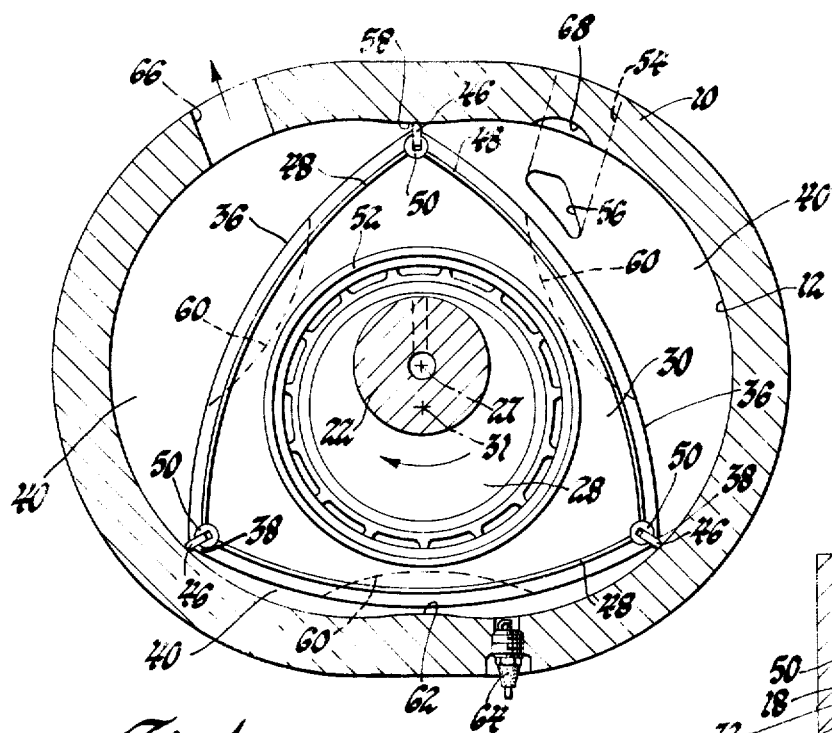
FIG. 1 is a transverse view with parts in section of an internal combustion rotary engine with phased internal exhaust gas recirculation according to the present invention.

Theh present invention is shown embodied in a presently commercial type internal combustion rotary engine which in a single rotor arrangement comprises a rotor housing 10 having an inwardly facing peripheral wall 12 and a pair of end housings 14 and 16 having parallel, oppositely facing, spaced inner end walls 18 and 20, respectively. The housing parts are secured together by bolts, not shown, and the inner housing walls 12, 18 and 20 cooperatively provide a cavity. A crankshaft 22 extends through the cavity and is rotatably supported in bearing lined collars 24 and 26 that are bolted to the end housings 14 and 16, the crankshaft axis 27 being coincident with the center line of the peripheral wall 12 and at right angles to the end walls 18 and 20. The crankshaft 22 is provided in the cavity with an eccentric 28 and a rotor 30 having a bearing lined hub is received on the eccentric 28 for rotation about the eccentric's center line 31 which is offset from and parallel to the crankshaft axis.

The rotor 30 has the general shape of a triangle with two parallel sides 32 and 34 at right angles to the rotor axis which face and run close to the end walls 18 and 20, respectively, and an outer peripheral wall with three arcuate faces 36 which face the peripheral wall 12. The peripheral wall 12 has the shape of a two-lobe epitrochoid or a curve parallel thereto whereby the three rotor apexes 38 remain adjacent thereto and the housing walls 12, 18, 20 and the rotor faces 36 cooperate to provide three variable volume working chambers 40 that are spaced around and move with the rotor while expanding and contracting in fixed relation to the stationary engine housing when the rotor is forced to rotate at one-third the speed of the crankshaft in a certain manner. This enforced relationship is provided by an annular external tooth stationary phasing gear 42 which is formed integral with the inboard end of the collar 26. Gear 42 is concentric with the crankshaft and meshes with an internal tooth rotary phasing gear 44 which is formed on rotor side 34 concentric with the rotor. The rotary phasing gear 44 has one and one-half times the number of teeth as the stationary phasing gear 42 to provide the required speed ratio of 3:1 between the crankshaft 22 and the rotor 30.

The working chambers 40 are sealed from each other by spring-biased apex seals 46 that are mounted in the rotor apexes and extend the width thereof and slide along the peripheral wall 12, spring-biased arcuate side seals 48 that are mounted in the rotor sides and extend adjacent the rotor faces and slide on the opposite housing end wall and spring-biased corner seals 50 which are mounted in the rotor sides near the apexes and each provide, while sliding on the opposite housing end wall, a sealing link between the ends of adjacent side seals and one end of the adjacent apex seal. In addition, there is provided a spring-biased circular oil seal 52 that is mounted in each rotor side and slides on the opposite end wall radially inward of the side seals to prevent oil used for lubrication of the engine from reaching outward to the working chambers.

A combustible air-fuel mixture from a suitable carburator arrangement, not shown, is made available to the working chambers 40 by identical intake passages 54 in the end housings 14 and 16, there being shown only one intake passage in the drawing. Each of the intake passages 54 has what is commonly called a side intake port 56 that is located in the respective end housing end wall on the leading side of the peripheral wall cusp 58 relative to the direction of rotor rotation indicated by the arrow. The intake ports 56 are located relative to the sealed rotor sides 32 and 34 so that the chambers 40 open past the rotor sides to the intake ports as they are expanding in the intake phase to draw in the combustible mixture and are closed thereto when they are contracting to compress the mixture in the following compression phase. A single channel or recess 60 is provided in each chamber face of the rotor so that when a rotor face is at or near its top-dead-center position with its center opposite the peripheral wall's other cusp 62 as shown in FIG. 1, the associated chamber is not then divided by this cusp. A spark plug 64 is mounted in the rotor housing 10 on the trailing side of the peripheral wall's other cusp 62 and is supplied with voltage from a suitable ignition system, not shown, at the proper time at or near top-dead-center to initiate combustion at the end of the compression phase. On combustion, the peripheral wall 12 takes the reaction forcing the rotor to continue rotating while the gas is expanding in the expansion or power phase. The leading apex seal 46 of the working chambers eventually traverses a peripheral exhaust port 66 through the peripheral wall 12 on the trailing side of the cusp 58 whereby the exhaust gas is then expelled in an exhaust phase to complete the cycle. It will also be appreciated from FIG. 2 with the rotor position thereshown that with the combination of side intake porting and peripheral exhaust porting or vice versa, there may be no overlap wherein the intake and exhaust are simultaneously connected to the same working chamber. Thus, the exhaust gases can be almost if not completely expelled from the working chambers under normal conditions.

Figure 3:
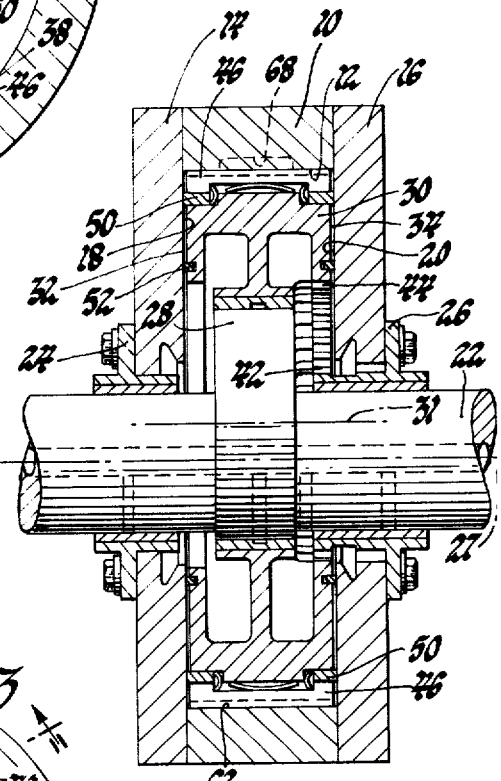
FIG. 3 is a view taken along the line 3—3 in FIG. 2.
Figure 2:
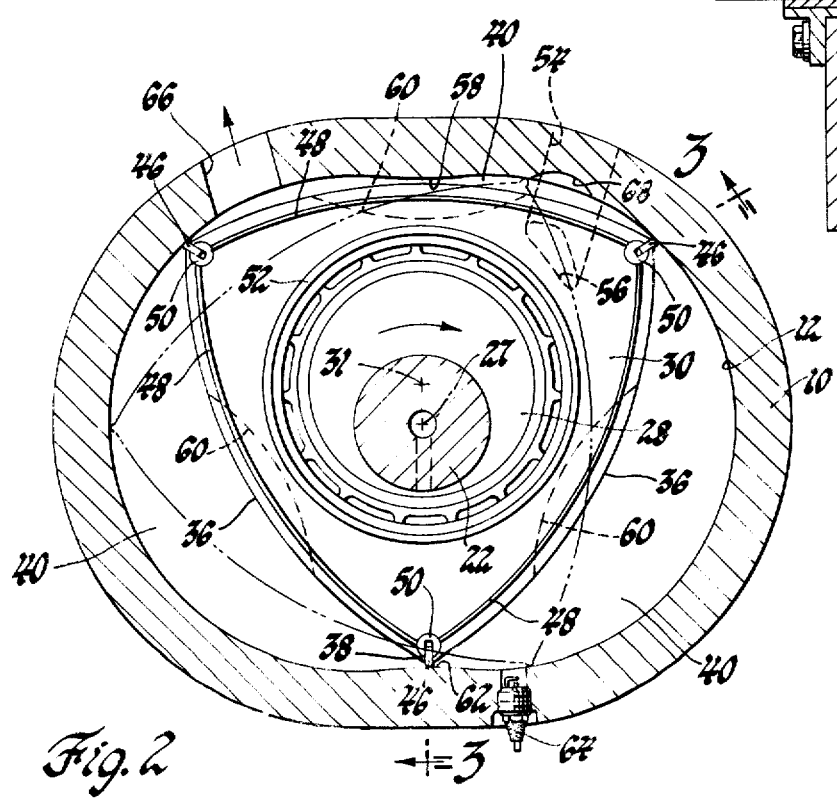
FIG. 2 is a view similar to FIG. 1 but showing the rotor in a position where exhaust gas recirculation is provided.
Figure 4:
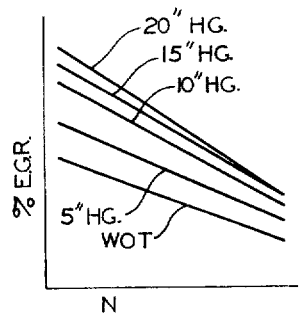
FIG. 4 is a graph showing typical characteristics of the exhaust gas recirculation provided by the present invention.

The internal combustion rotary engine structure thus far described is conventional and would not normally provide for any substantial internal exhaust gas recirculation. According to the present invention, phased internal exhaust gas recirculation is provided in this structure with a very simple modification consisting of a peripherally extending slot or recess 68 in the peripheral wall 12. Slot 68 is arcuate shaped in the peripheral direction as shown in FIGS. 1 and 2 and has a rectangular cross-section as shown in FIG. 3 and thus can be easily machined in the peripheral wall. The slot 68 is located on the leading side of the side intake ports 56 and also relative to the exhaust port 66 so that when a rotor face is at its bottom-dead-center position as shown in phantom line in FIG. 2 with the trailing portion of the associated chamber passing the exhaust port 66 to end the exhaust phase, the slot 68 on further rotor rotation then provides a passage past this chamber's leading apex seal to the leading chamber just while the latter chamber is completing its intake phase and beginning its compression phase and while the intake ports 56 are still closed to the exhausting trailing chamber. This passage through slot 68 is blocked again when the leading chamber is substantially into its compression phase as shown by the solid-line rotor position in FIG. 2. As a result, some of the exhaust gas in the trailing chamber is forced by the pressure differential between substantially atmospheric pressure and intake manifold vacuum through the slot 68 into the trailing portion of the leading chamber just while the latter chamber is ending intake of a fresh charge and thereafter starting compression. Thus, the chamber that is undergoing compression has the fresh mixture in its trailing portion displaced by exhaust gas and recognizing in the rotary engine that the combustion flame travels most rapidly in the direction of rotor rotation, the amount of quenched hydrocarbon in the trailing region of the working chamber upon combustion is thereby substantially reduced. In FIG. 4, typical characteristics of the exhaust gas recirculation provided by the exhaust gas recirculation slot 68 are depicted. As shown in this graph, wherein percent of exhaust gas recirculated (EGR) is plotted against crankshaft speed (N) at different intake manifold vacuum pressures measured in inches of mercury ("HG), the percentage of gas recirculated decreases with increasing engine speed at constant intake manifold vacuum and also decreases with decreasing intake manifold vacuum with the greatest percentage of exhaust gas recirculation occurring at a maximum intake manifold vacuum of 20 inches mercury and decreasing to a minimum at wide open throttle (WOT). These are known to be desired EGR characteristics recognizing that hydrocarbon emissions are typically highest at light loads while increasing power demands requires reduced EGR to increase efficiency. In addition, by forcing the unburned mixture forward into the more readily burning zone, the fuel economy is also helped. Furthermore, the recirculated exhaust gas because it is located in the trailing region immediately ahead of the trailing apex seal also provides a barrier to the combustion temperatures with the result that the trailing apex seal experiences lower temperatures and thus has improved life.

The above described embodiment is illustrative of the invention which may be modified within the scope of the appended claims.

I claim:

1. An internal combustion rotary engine having housing means with an inwardly facing peripheral wall and oppositely facing inner end walls cooperatively defining a cavity, a crankshaft rotatably supported in said housing and having an eccentric located in said cavity, a rotor rotatably mounted on said cavity, said rotor having peripheral faces facing said peripheral wall providing a plurality of chambers that are spaced about and move with said rotor while varying in volume as said rotor rotates, intake passage means in said housing including an intake port periodically opened by said rotor to deliver a fresh air-fuel mixture to said working chambers as they expand in an intake phase, exhaust passage means including an exhaust port periodically opened by said rotor to receive exhaust gas from said working chambers as they contract in an exhaust phase following an expansion or power phase, and a peripherally extending exhaust gas recirculation slot in said peripheral wall arranged relative to said intake port and said exhaust port so as to connect the trailing portion of each said working chamber only when it is ending the intake phase and beginning the compression phase to the leading portion of the trailing working chamber only when it is completing the exhaust phase whereby exhaust gas from the leading portion of each said working chamber near the end of the exhaust phase is directed by said exhaust gas recirculation slot to the trailing portion of the leading working chamber at the ending of the intake phase and the beginning of the compression phase with the percentage of exhaust gas recirculated increasing with increasing intake passage vacuum and decreasing rotor speed.

2. An internal combustion rotary engine having housing means with an inwardly facing two-lobe peripheral wall and oppositely facing inner end walls cooperatively defining a cavity, a crankshaft rotatably supported in said housing and having an eccentric located in said cavity, a rotor rotatably mounted on said eccentric in said cavity, said rotor having sides facing said end walls and three peripheral faces between apexes facing said peripheral wall providing a plurality of chambers that are spaced about and move with said rotor while varying in volume as said rotor rotates while said apexes remain adjacent said peripheral wall, intake passage means in said housing including at least one intake port that extends through one of said end walls and is periodically opened past the opposite rotor side to deliver a fresh air-fuel mixture to said working chambers as they expand in an intake phase, exhaust passage means including an exhaust port through said peripheral wall arranged to be opened past said apexes to said working chambers as they contract in an exhaust phase following an expansion or power phase, and a peripherally extending exhaust gas recirculation slot in said peripheral wall arranged relative to said intake port and said exhaust port so as to connect the trailing portion of each said working chamber only when it is ending the intake phase and beginning the compression phase to the leading portion of the trailing working chamber only when it is completing the exhaust phase and just prior to opening to said intake port whereby exhaust gas from the leading portion of each said working chamber near the end of the exhaust phase is directed by said exhaust gas recirculation slot to the trailing portion of the leading working chamber at the ending of the intake phase and the beginning of the compression phase with the percentage of exhaust gas recirculated increasing with increasing intake passage vacuum and decreasing rotor speed.

* * * * *

UNITED STATES PATENT OFFICE
CERTIFICATE OF CORRECTION

PATENT NO. : 3,906,907
DATED : September 23, 1975
INVENTOR(S) : Raymond P. Canale It is certified that error appears in the above-identified patent and that said Letters Patent are hereby corrected as shown below:

Column 1, line 64, "Theh" should read -- The --.
Column 4, line 37, after "said" first occurrence, insert -- eccentric in said --.

Signed and Sealed this twenty-seventh Day of April 1976

[SEAL]

Attest:

RUTH C. MASON
Attesting Officer

C. MARSHALL DANN
Commissioner of Patents and Trademarks